(12) United States Patent
Nakagawa et al.

(10) Patent No.: US 10,059,225 B2
(45) Date of Patent: Aug. 28, 2018

(54) FUEL CELL VEHICLE AND CONTROL METHOD FOR FUEL CELL VEHICLE

(71) Applicant: HONDA MOTOR CO., LTD., Tokyo (JP)

(72) Inventors: Takuto Nakagawa, Wako (JP); Tomoaki Nakagawa, Wako (JP); Kenji Taruya, Wako (JP); Kuniaki Ojima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/431,767

(22) Filed: Feb. 14, 2017

(65) Prior Publication Data

US 2017/0246965 A1 Aug. 31, 2017

(30) Foreign Application Priority Data

Feb. 26, 2016 (JP) ................. 2016-035623

(51) Int. Cl.
| | |
|---|---|
| *B60L 11/18* | (2006.01) |
| *H01M 8/04089* | (2016.01) |
| *H01M 8/04014* | (2016.01) |
| *H01M 8/0662* | (2016.01) |
| *H01M 8/04119* | (2016.01) |

(52) U.S. Cl.
CPC ....... *B60L 11/1898* (2013.01); *B60L 11/1892* (2013.01); *H01M 8/04014* (2013.01); *H01M 8/04089* (2013.01); *H01M 8/04156* (2013.01); *H01M 8/0687* (2013.01); *H01M 2250/20* (2013.01); *Y02T 90/32* (2013.01)

(58) Field of Classification Search
CPC .................................................. B60L 11/1898
See application file for complete search history.

(56) References Cited

U.S. PATENT DOCUMENTS

| | | | | |
|---|---|---|---|---|
| 2014/0170530 | A1* | 6/2014 | Kawaura | H01M 8/04201 429/515 |
| 2014/0295305 | A1* | 10/2014 | Wake | H01M 8/04223 429/429 |
| 2015/0183336 | A1* | 7/2015 | Kim | B60L 11/1885 701/22 |
| 2016/0137194 | A1* | 5/2016 | Kajiwara | B60W 20/50 701/22 |

(Continued)

FOREIGN PATENT DOCUMENTS

| | | |
|---|---|---|
| JP | 2001-351667 | 12/2001 |
| JP | 2013-237393 | 11/2013 |

OTHER PUBLICATIONS

Japanese Office Action for corresponding JP Application No. 2016-035623, dated Oct. 3, 2017 (w/ English machine translation).

*Primary Examiner* — Brian L Swenson
(74) *Attorney, Agent, or Firm* — Mori & Ward, LLP (57) ABSTRACT

A fuel cell vehicle includes a lid, a switch, a sensor, and circuitry. The lid opens and closes a fuel inlet through which fuel gas is to be supplied to a tank. The switch takes an opening position to open the lid and a closing position to close the lid. The sensor detects whether the lid opens or closes the fuel inlet. The circuitry is configured to prohibit the fuel cell vehicle from travelling when the sensor detects that the lid opens the fuel inlet while the switch takes the opening position.

18 Claims, 6 Drawing Sheets

(56) References Cited

U.S. PATENT DOCUMENTS

2016/0141683 A1* 5/2016 Imanishi ........... H01M 8/04753
  429/444
2016/0311340 A1* 10/2016 Nada .................. B60L 11/1881

* cited by examiner

FUEL CELL VEHICLE AND CONTROL METHOD FOR FUEL CELL VEHICLE

CROSS-REFERENCE TO RELATED APPLICATIONS

The present application claims priority under 35 U.S.C. § 119 to Japanese Patent Application No. 2016-035623, filed Feb. 26, 2016, entitled "Fuel Cell Vehicle." The contents of this application are incorporated herein by reference in their entirety.

BACKGROUND

1. Field

The present disclosure relates to a fuel cell vehicle and a control method for a fuel cell vehicle.

2. Description of the Related Art

When a tank in a fuel cell vehicle is filled with hydrogen gas (fuel gas), it is necessary to prevent disconnection of a nozzle of a hydrogen station from a receptacle (feed unit) connected with the tank. Thus, the fuel cell vehicle is required to restrict movement of the vehicle while being filled with hydrogen gas.

For example, a vehicle disclosed in Japanese Unexamined Patent Application Publication No. 2001-351667 is configured not to allow a lid to open while a fuel cell is driven, in other words, while the vehicle is in a movable state, and thus movement of the vehicle during filling is restricted by stopping drive of the fuel cell. In addition, this vehicle is configured not to activate the fuel cell when the lid is determined to be in an open state after fuel filling as well.

SUMMARY

According to a first aspect of the present invention, a fuel cell vehicle includes a lid, a switch, a sensor, and a control unit. The lid is capable of opening and closing a feed unit for supplying fuel gas to a tank. The switch performs an operation to switch opening and closing of the lid. The sensor is configured to detect an open state and a closed state of the lid. The control unit is configured to perform travel restriction control to restrict travel of the fuel cell vehicle when an opening operation on the switch coincides with detection of the open state of the lid by the sensor.

According to a second aspect of the present invention, a fuel cell vehicle includes a lid, a switch, a sensor, and circuitry. The lid opens and closes a fuel inlet through which fuel gas is to be supplied to a tank. The switch takes an opening position to open the lid and a closing position to close the lid. The sensor detects whether the lid opens or closes the fuel inlet. The circuitry is configured to prohibit the fuel cell vehicle from travelling when the sensor detects that the lid opens the fuel inlet while the switch takes the opening position.

According to a third aspect of the present invention, a control method for a fuel cell vehicle including a lid to open and close a fuel inlet through which fuel gas is to be supplied to a tank and a switch to take an opening position to open the lid and a closing position to close the lid, the control method includes detecting whether the lid opens or closes the fuel inlet. The fuel cell vehicle is prohibited from travelling when it is detected that the lid opens the fuel inlet while the switch takes the opening position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Preferred embodiments of a fuel cell vehicle according to the present disclosure will be described below in detail with reference to the accompanying drawings.

Figure 1:
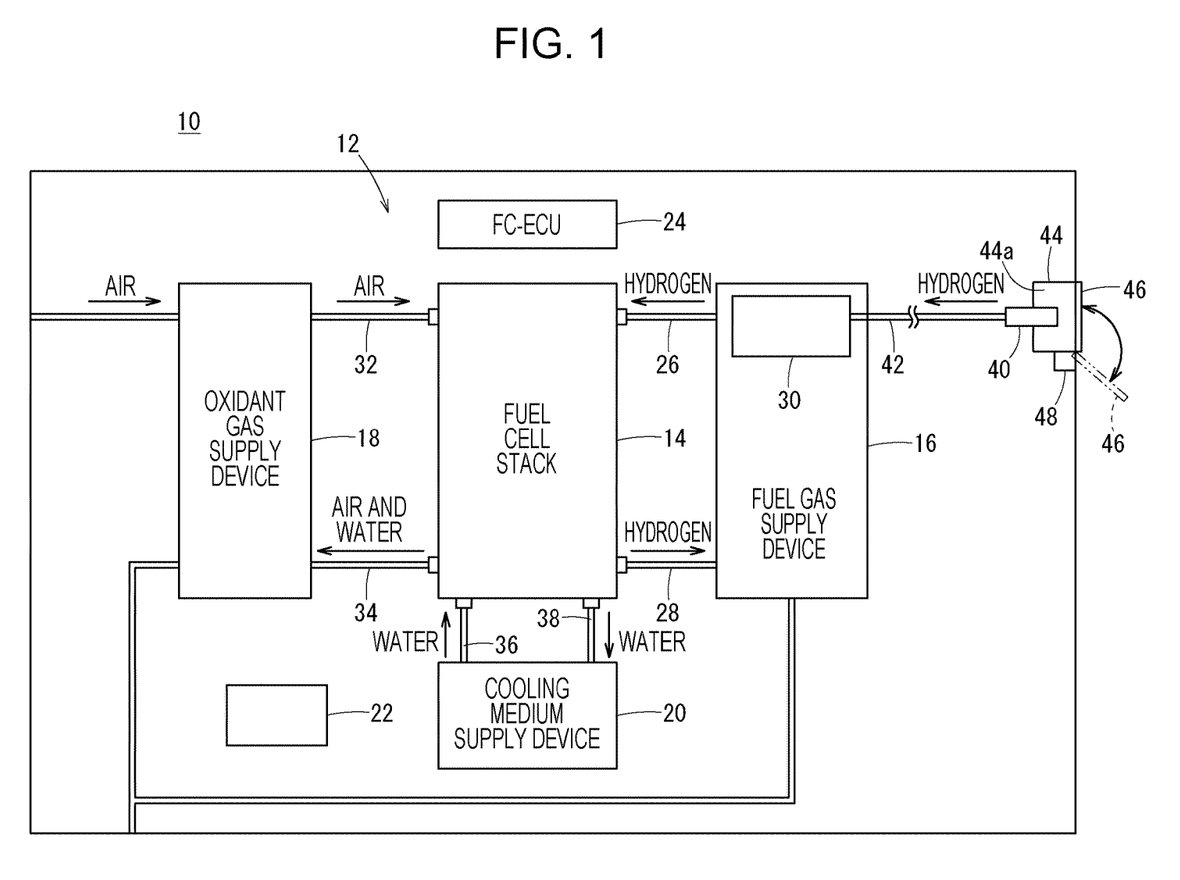
FIG. 1 is an explanatory diagram of a schematic configuration of a fuel cell system mounted on a fuel cell vehicle according to an embodiment of the present disclosure.

As illustrated in FIG. 1, a fuel cell vehicle 10 according to an embodiment of the present disclosure is equipped with a fuel cell system 12 configured to generate electricity by using hydrogen gas (fuel gas) and air (oxidant gas). The fuel cell system 12 supplies electrical power to a drive source such as a motor not illustrated, and the fuel cell vehicle 10 travels through rotational drive of the drive source.

The fuel cell system 12 includes a fuel cell stack 14 (fuel cell), a fuel gas supply device 16 configured to supply hydrogen gas, an oxidant gas supply device 18 configured to supply air, a cooling medium supply device 20 configured to supply cooling medium, a battery 22 as an energy storage device, and a FC-ECU 24 as a system control device.

The fuel cell stack 14 includes a structure of a stack including an electrolyte film, an electrode structure, and a separator (not illustrated) in a housing thereof, and has a function to perform power generation through supply of hydrogen gas and air into the housing includes.

The fuel gas supply device 16 is connected with the fuel cell stack 14 through a hydrogen gas supply path 26 and a hydrogen gas discharge path 28. The fuel gas supply device 16 includes a hydrogen tank 30 that stores therein high-pressure hydrogen. Hydrogen gas in the hydrogen tank 30 is pumped through the hydrogen gas supply path 26 by a hydrogen pump not illustrated, and then supplied to the fuel cell stack 14.

The oxidant gas supply device 18 is connected with the fuel cell stack 14 through an air supply path 32 and an air discharge path 34. The oxidant gas supply device 18 includes an air pump (not illustrated) configured to compress air from atmosphere and supply the compressed air to the fuel cell stack 14. The cooling medium supply device 20 is connected with the fuel cell stack 14 through a cooling medium supply path 36 and a cooling medium discharge path 38, and circulates water as cooling medium by a water pump (not illustrated).

The fuel cell vehicle 10 having the above-described configuration includes a receptacle 40 (feed unit) for taking hydrogen gas into the hydrogen tank 30 from a nozzle of an external hydrogen station (hydrogen supply source). The hydrogen tank 30 and the receptacle 40 are communicated with each other through a hydrogen gas intake path 42. The receptacle 40 is fixed to a reception box 44 as a recess into the vehicle on a cowl of the fuel cell vehicle 10. The reception box 44 includes a reception space 44a therein, and the receptacle 40 protrudes toward outside of the vehicle from a bottom surface of the reception space 44a.

In the fuel cell vehicle 10, the reception space 44a is covered with a lid 46 to achieve an unexposed state of the receptacle 40 at traveling. The lid 46 is formed in a plate shaped along the cowl of the fuel cell vehicle 10.

The lid 46 opens and closes the reception space 44a through an electric actuator 48 provided near the reception box 44 (in other words, puts the receptacle 40 in an expose state and an unexposed state). The electric actuator 48 is not particularly limited, but may be, for example, a servomotor. The lid 46 is configured to be manually opened and closed by a user to allow hydrogen gas filling at failure of the electric actuator 48.

Figure 2:
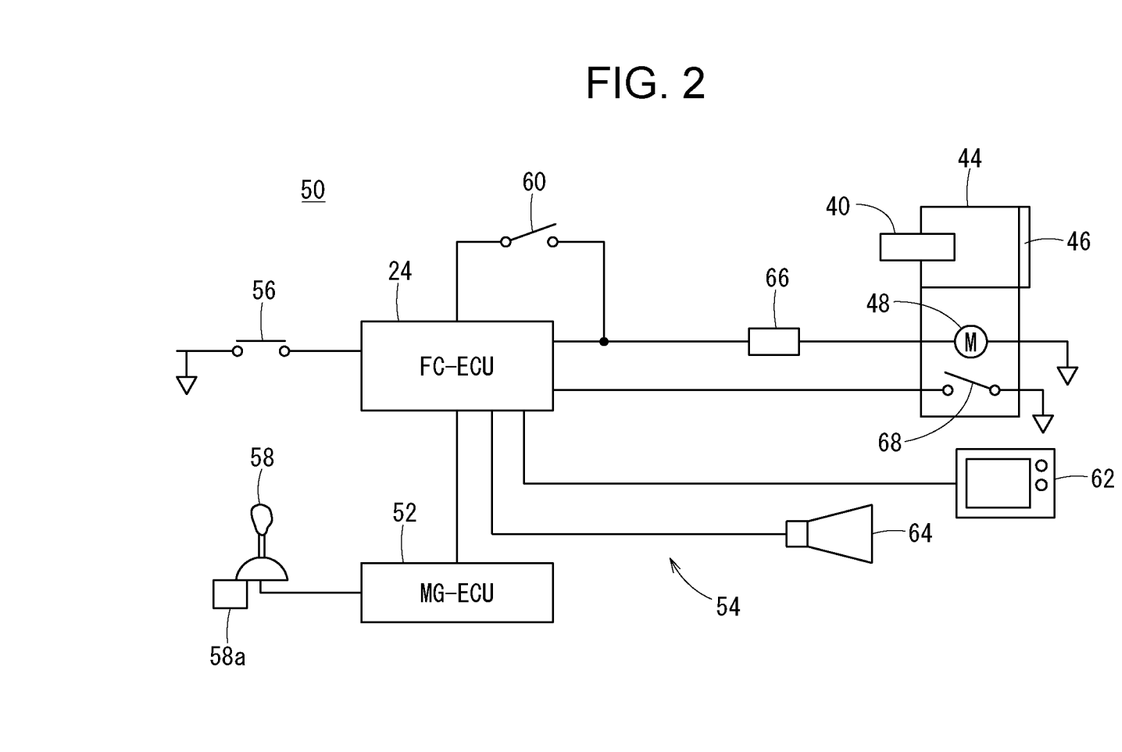
FIG. 2 is a schematic explanatory diagram illustrating the configuration of a filling drive device of the fuel cell vehicle.

The following describes, in detail with reference to FIG. 2, a configuration (hereinafter referred to as a filling drive device 50) that opens and closes the lid 46 of the fuel cell vehicle 10 to store hydrogen gas in the hydrogen tank 30. In the filling drive device 50, the FC-ECU 24 of the fuel cell system 12 described above, and an MG-ECU 52 of a motor generator (MG) system are connected with each other through an on-board network 54 such as a CAN.

The FC-ECU 24 serves as a main controller configured to perform control of the filling drive device 50. The FC-ECU 24 may be that used in the conventional fuel cell system, and may be, for example, an input and output interface not illustrated, or a known computer including, for example, a processor and a memory.

The filling drive device 50 includes a lid switch 56 and a shift lever 58 as mechanical structures operated by the user of the fuel cell vehicle 10 at hydrogen gas filling. The lid switch 56 is electrically connected with the FC-ECU 24. The shift lever 58 is connected with the MG-ECU 52 so that a shift position can be transferred as a signal by a shift position sensor (not illustrated). The FC-ECU 24 acquires an opening operation position or a closing operation position from the lid switch 56, and performs processing in accordance with an operation by the user. The FC-ECU 24 acquires position information of the shift lever 58 from the MG-ECU 52, for example, before, during, and after hydrogen gas filling.

The FC-ECU 24 is also electrically connected with an ignition switch 60 and is connected with a monitor 62 and a speaker 64 through an ECU of an on-board information presentation system (including a display panel and a navigation device) not illustrated.

In the filling drive device 50, the electric actuator 48 configured to perform opening and closing drive of the lid 46 described above and the FC-ECU 24 are electrically connected with each other through a relay switch 66. The relay switch 66 is switched on and off in accordance with an instruction from the FC-ECU 24, and supplies the electric actuator 48 with electrical power of the battery 22 (refer to FIG. 1) when the relay switch 66 is on.

Thus, having detected an opening operation on the lid switch 56 by the user, the FC-ECU 24 of the filling drive device 50 drives the electric actuator 48 to transition the lid 46 from a closed state to an open state, thereby exposing the receptacle 40. The FC-ECU 24 stops drive of the lid 46 when the lid 46 opens the reception space 44a at a predetermined opening degree.

In contrasts, having detected a closing operation on the lid switch 56 by the user, the FC-ECU 24 drives the electric actuator 48 to transition the lid 46 from the open state to the closed state. The FC-ECU 24 stops drive of the lid 46 when the lid 46 closes the reception space 44a at a predetermined opening degree.

The reception box 44 including the receptacle 40 and the lid 46 is also provided with a lid sensor 68 configured to detect opening and closing of the lid 46 (which is the position of the lid 46). The lid sensor 68 is, for example, an optical position sensor, and simply detects whether the lid 46 is in the open state or the closed state. Alternatively, the lid sensor 68 may be, for example, a rotary encoder to detect the angle of the lid 46.

The FC-ECU 24 is preferably configured to display the open state or the closed state of the lid 46 on the monitor 62 upon reception of a result of the detection of the open/closed state of the lid 46 by the lid sensor 68. This configuration allows the user in the vehicle to check the open/closed state of the lid 46 (in other words, whether hydrogen gas filling is possible). Alternatively, the monitor 62 may display only that the lid 46 is open.

The FC-ECU 24 performs travel restriction control (hereinafter referred to as filling travel prohibition control) to prohibit travel of the fuel cell vehicle 10 during hydrogen gas filling. For example, in the filling travel prohibition control, movement of the shift lever 58 is restricted by a shift lock mechanism 58a provided near the shift lever 58. With this configuration, the shift lever 58 does not move from a parking position during hydrogen gas filling, thereby prohibiting travel of the fuel cell vehicle 10. The shift lock mechanism 58a includes a pressure sensor (not illustrated) configured to detect an operation force on the shift lever 58, and a result of determination of whether the user has operated the shift lever 58 is transmitted to the FC-ECU 24 through the MG-ECU 52.

Figure 3:
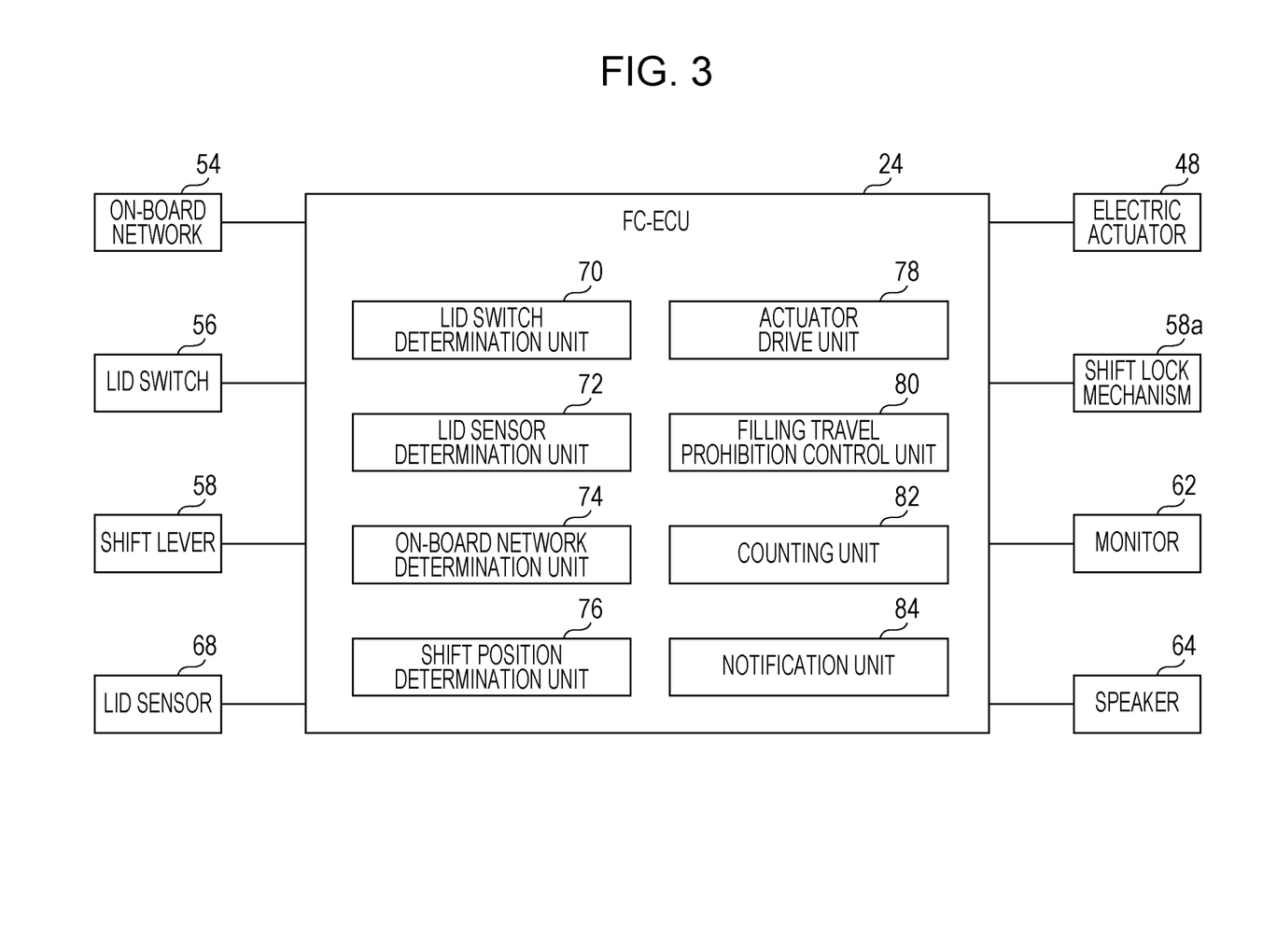
FIG. 3 is a functional block diagram illustrating an internal configuration of a FC-ECU at filling with hydrogen gas.

Then, the FC-ECU 24 determines whether to perform the filling travel prohibition control under various kinds of conditions of the fuel cell vehicle 10, and as necessary, does not perform or cancels the filling travel prohibition control, thereby achieving further improved usability of the fuel cell vehicle 10. To achieve this, as illustrated in FIG. 3, the FC-ECU 24 includes a lid switch determination unit 70, a lid sensor determination unit 72, an on-board network determination unit 74, a shift position determination unit 76, an actuator drive unit 78, a filling travel prohibition control unit 80, a counting unit 82, and a notification unit 84.

The lid switch determination unit 70 determines whether the lid switch 56 is at any of the opening operation position and the closing operation position based on a signal from the lid switch 56. The lid sensor determination unit 72 determines whether the lid 46 is in any of the open state and the closed state based on a signal from the lid sensor 68. The on-board network determination unit 74 performs self-examination of the state of the on-board network 54 under control of the FC-ECU 24 so as to determine whether the on-board network 54 normally functions. The shift position determination unit 76 determines the position of the shift lever 58 (in other words, an operation of the shift lever 58) transmitted through the MG-ECU 52.

The actuator drive unit 78 controls drive of the electric actuator 48, in other words, opening and closing of the lid 46. The filling travel prohibition control unit 80 controls operation of the shift lock mechanism 58a, in other words, restriction of operation of the shift lever 58 or permission of operation thereof. The counting unit 82 counts the number of times that the shift lever 58 is operated by the user, which is transmitted from the MG-ECU 52. The notification unit 84, as necessary, displays warning information on the monitor 62, and outputs an alert from the speaker 64.

The fuel cell vehicle 10 according to the present embodiment is basically configured as described above. The following describes an effect of the fuel cell vehicle 10.

To fill the hydrogen tank 30 with fuel gas, the user of the fuel cell vehicle 10 stops the vehicle close to a hydrogen station. The lid 46 is in the closed state being covered with the receptacle 40 while the fuel cell vehicle 10 is moving. An operation to switch the lid switch 56 from the closing operation position by the user is disabled during the movement.

Figure 4:
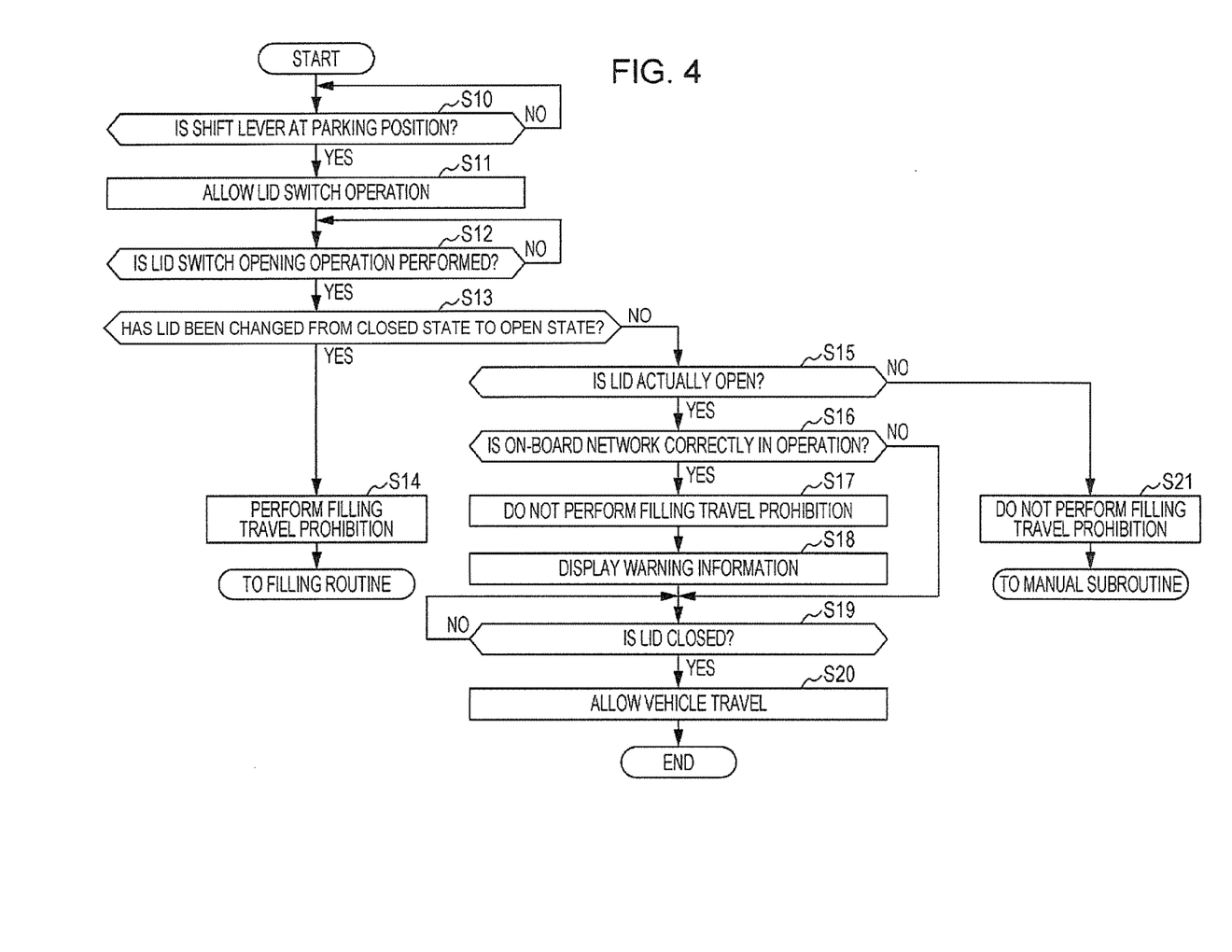
FIG. 4 is a first flowchart illustrating control of the fuel cell vehicle at filling.

In addition, the shift position determination unit 76 of the FC-ECU 24 determines whether the shift lever 58 is positioned at the parking position while the ignition switch 60 is on (the vehicle is driven) (step S10). This is because the fuel cell vehicle 10 can be identified to be stopped when the shift lever 58 is positioned at the parking position.

If the shift lever 58 is moved to the parking position, the FC-ECU 24 allows an operation on the lid switch 56 and stops power generation at the fuel cell stack 14 of the fuel cell system 12 (step S11). In this manner, the fuel cell system 12 allows filling of the hydrogen tank 30 with fuel gas.

Next, the lid switch determination unit 70 of the FC-ECU 24 determines whether the lid switch 56 is opened by the user (step S12). If the lid switch 56 is opened at step S12, the actuator drive unit 78 of the FC-ECU 24 opens the lid 46 by driving the electric actuator 48 to expose the receptacle 40. Alternatively, having recognized failure of the filling drive device 50 in advance and knowing the lid 46 cannot be opened through an operation on the lid switch 56, the user may manually open the lid 46. This manual operation of the lid 46 by the user will be described in detail with a manual subroutine later.

The lid sensor determination unit 72 determines whether the lid 46 has changed from the closed state to the open state based on the position of the lid 46 transmitted from the lid sensor 68 at drive of the electric actuator 48 (step S13). Specifically, if the lid sensor 68 determines the open state of the lid 46, it can be estimated that the electric actuator 48 and the lid sensor 68 are normal. If the lid sensor 68 determines the closed state of the lid 46, it can be estimated that abnormity occurs to the filling drive device 50.

Thus, if the lid sensor 68 determines the open state of the lid 46 (YES at step S13), the filling travel prohibition control unit 80 performs the filling travel prohibition control (step S14). In the filling travel prohibition control, the filling travel prohibition control unit 80 restricts movement of the shift lever 58 from the parking position through the shift lock mechanism 58a. The filling travel prohibition control unit 80 may lock operation of the fuel cell system 12 in a disabled state (power generation disabled). This achieves more reliable prevention of movement of the fuel cell vehicle 10 from a stopped position.

The fuel cell vehicle 10 performs hydrogen gas filling during the filling travel prohibition control. Operation during hydrogen gas filling will be described later with a filling routine.

If the closed state of the lid 46 is determined at step S13 (NO at step S13), it is suggested that any component of the filling drive device 50 is failed. Examples of such a case include a case in which failure occurs to the electric actuator 48, a case in which failure occurs to the lid sensor 68, and a case in which failure or communication defect occurs to the on-board network 54 of the fuel cell vehicle 10. Thus, the FC-ECU 24 is configured to perform control in accordance with failure.

Specifically, at step S15, the user is prompted to check whether the lid 46 is actually open. In this case, the notification unit 84 of the FC-ECU 24 preferably displays trouble handling information on the monitor 62 or outputs the information by sound from the speaker 64 to prompt check of an installation place of the lid 46. Having checked the actual state of the lid 46, the user is prompted to input whether the lid 46 is in the open state or the closed state. This inputting is preferably performed through, for example, a display window displayed on the monitor 62 for selecting a state of the lid 46. The FC-ECU 24 proceeds to step S16 if the lid 46 is actually open, or proceeds to step S21 if the lid 46 is actually not open.

If the lid 46 is actually open (YES at step S15), it is suggested that the electric actuator 48 is normally functioning. Thus, the FC-ECU 24 determines whether the on-board network 54 is normally functioning through the on-board network determination unit 74 (step S16). The determination of the on-board network 54 can be checked by transmitting, from the FC-ECU 24 to another ECU through the on-board network 54, some pieces of information that can be responded, and receiving a reply thereto. Thus, the determination of the on-board network 54 allows recognition of whether abnormity occurs to the on-board network 54, or the lid sensor 68 is failed while the on-board network 54 is normal.

If the on-board network 54 is normal at step S16 (YES at step S16), the FC-ECU 24 does not perform the filling travel prohibition control through the filling travel prohibition control unit 80 at the next step S17. When the lid sensor 68 is failed, the position of the lid 46 is unknown but fuel gas filling is not affected. Thus, the FC-ECU 24 allows fuel gas filling by not performing the filling travel prohibition control without locking the shift lever 58. Accordingly, the user or a worker at the hydrogen station can fill the hydrogen tank 30 with fuel gas by connecting the nozzle with the receptacle 40 being exposed when the lid 46 is open.

During fuel gas filling, the notification unit 84 displays warning information on the monitor 62 (step S18) to warn the user of prevention of movement of the fuel cell vehicle 10. The warning information displayed on the monitor 62 may be, for example, "Please check that the filling lid is closed before operating the shift lever". The warning information may be output by sound from the speaker 64.

Thereafter, when fuel gas filling ends, the connection between the receptacle 40 and the nozzle is canceled. Then, at step S19, the FC-ECU 24 determines whether an operation to close the lid 46 is performed. The operation to close the lid 46 is, for example, a closing operation on the lid switch 56 by the user, or application of a pressing force to the opened lid 46. The FC-ECU 24 and the electric actuator 48 respond to this operation, and the lid 46 closes the reception space 44a accordingly.

Then, the FC-ECU 24 drives the fuel cell system 12 to allow travel of the fuel cell vehicle 10 (step S20). The fuel cell vehicle 10 starts traveling when the user moves the shift lever 58 from the parking position to a driving position, for example.

At step S16, if abnormity occurs to the on-board network 54 (NO at step S16), the FC-ECU 24 proceeds to step S19 without performing steps S17 and S18. Specifically, when abnormity occurs to the on-board network 54, information (filling amount of fuel gas, for example) processed by the FC-ECU 24 is potentially not displayed on the monitor 62, and thus it is prompted not to perform fuel gas filling. Processing at steps S19 and S20 is same as described above.

Travel of the fuel cell vehicle is allowed through these steps, and then the user can move the fuel cell vehicle 10 to, for example, a garage.

If the lid 46 is actually not open at step S15 (NO at step S15), it is suggested that the electric actuator 48 is failed. In this case, it is possible that the user manually opens the lid 46 to perform hydrogen gas filling. Thus, the FC-ECU 24 does not perform the filling travel prohibition control at step S21, but performs the manual subroutine as the following process. In the filling travel prohibition control, the shift lever 58 is not locked, and thus the user can move the fuel cell vehicle 10 to, for example, a garage without performing fuel filling.

Figure 5:
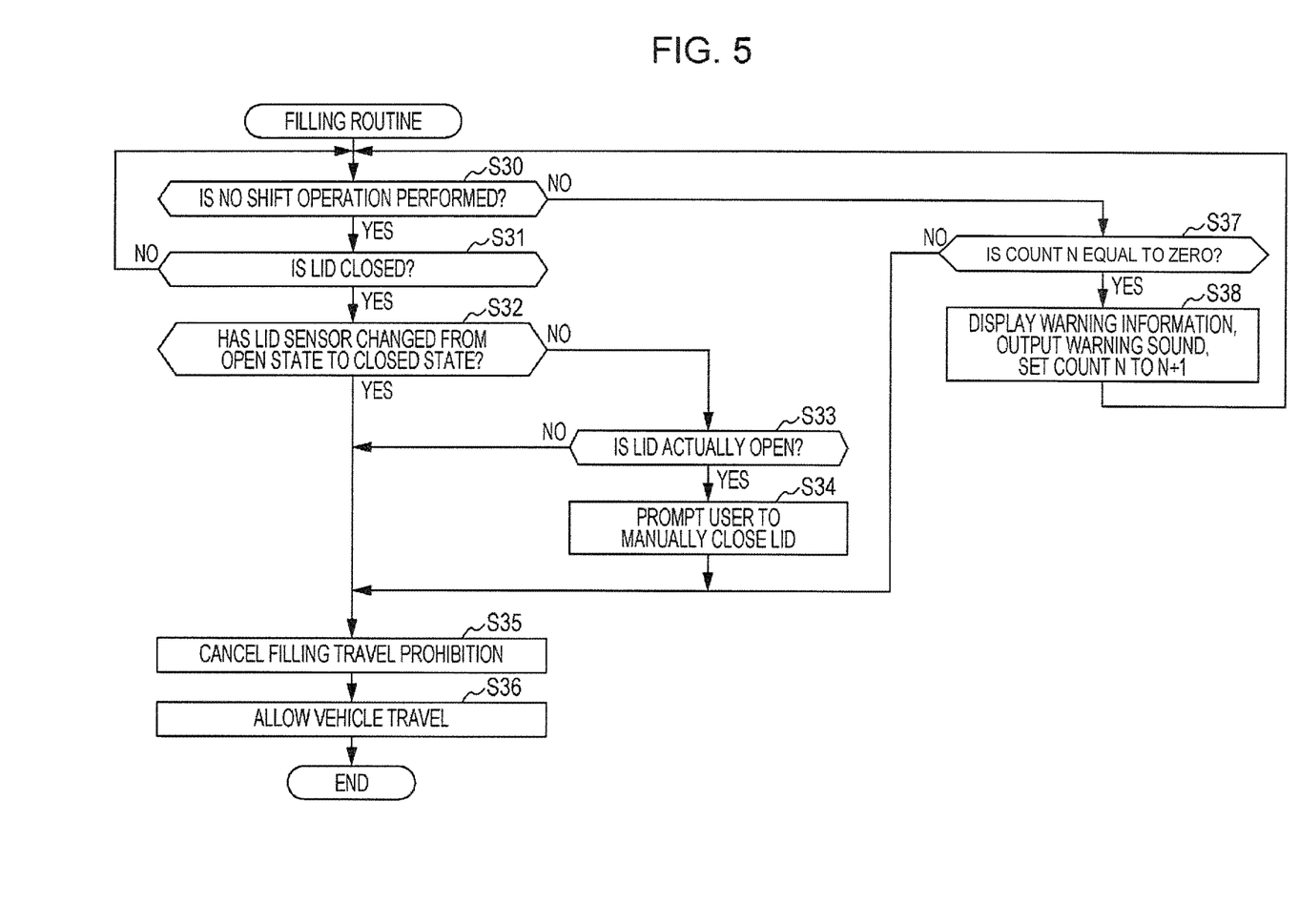
FIG. 5 is a second flowchart illustrating control of the fuel cell vehicle at filling.

The following describes the filling routine with reference to FIG. 5. As described above, when the filling routine is to be performed, the lid 46 has been normally opened by the electric actuator 48 and the open state of the lid 46 has been checked by the lid sensor 68. Thus, the nozzle is connected with the receptacle 40 by the user or the worker at the hydrogen station, and hydrogen gas is supplied into the hydrogen tank 30 from the receptacle 40 through the hydrogen gas intake path 42.

Then, the shift position determination unit 76 constantly detects whether a shift operation (operation from the parking position to another position) is performed on the shift lever 58 during hydrogen gas filling (step S30). For example, the shift operation can be easily detected by detecting an operation force applied on the shift lock mechanism 58a through, for example, a pressure sensor and performing determination of the operation force through the MG-ECU 52 and the FC-ECU 24. At step S30 (during filling), the FC-ECU 24 proceeds to step S31 if no shift operation is performed, or proceeds to step S37 if the shift operation is performed.

Next, the lid sensor determination unit 72 of the FC-ECU 24 determines whether hydrogen gas filling ends and an operation to close the lid 46 is performed (step S31). When this operation is performed, similarly to step S19, the FC-ECU 24 and the electric actuator 48 perform an operation to close the lid 46. If no operation to close the lid 46 is performed, the FC-ECU 24 returns to step S30 and repeats the same flow.

If the operation close to the lid 46 is performed, then the lid sensor determination unit 72 determines whether the lid sensor 68 has been changed from the open state to the closed state (step S32). Specifically, if the position of the lid 46 detected by the lid sensor 68 has not been changed from the open state to the closed state, it can be determined that the filling drive device 50 is failed during hydrogen gas filling. Since this failure is estimated to be a trouble with the electric actuator 48 or the lid sensor 68, the FC-ECU 24 performs steps S33 and S34 if the lid sensor 68 has not changed from the open state to the closed state (NO at step S32).

Specifically, at step S33, the user is prompted to whether the lid 46 is actually open. In this case, the FC-ECU 24 preferably displays trouble handling information on the monitor 62 or outputs the information by sound from the speaker 64 to prompt check of the installation place of the lid 46. Having checked the actual state of the lid 46, the user is prompted to input whether the lid 46 is in the open state or the closed state. When the lid 46 is actually closed, it is determined that the lid sensor 68 is failed. When the lid 46 is actually not closed, it is determined that the electric actuator 48 is failed. In this manner, the place of failure in the filling drive device 50 is determined, and thus the FC-ECU 24 can give the user notification to prompt, for example, repair of the fuel cell vehicle 10.

If it is determined that the lid 46 is actually open (YES at step S33), the FC-ECU 24 causes the user to close the lid 46 by prompting the user to manually close the lid 46 through the notification unit 84 (step S34).

Thereafter, the FC-ECU 24 cancels the filling travel prohibition control performed by the filling travel prohibition control unit 80 (step S35). Specifically, the lock of the shift lever 58 by the shift lock mechanism 58a is canceled to allow movement of the shift lever 58. Accordingly, in response to an operation on the shift lever 58 by the user, the FC-ECU 24 drives the fuel cell system 12 to allow travel of the fuel cell vehicle 10 (step S36). These steps S35 and S36 are performed after steps S32, S33, and S34 and also performed depending on a result of determination at step S37 to be described later, and thus the fuel cell vehicle 10 can avoid disadvantage of incapability to travel due to failure of the filling drive device 50.

If an operation on the shift lever 58 is detected at step S30 (NO at step S30), the FC-ECU 24 checks whether a count N at the counting unit 82 is zero (step S37), and proceeds to step S38 if the count N is zero. At step S38, the notification unit 84 displays warning information on the monitor 62 and outputs alert sound from the speaker 64. In addition, the count N at the counting unit 82 is incremented by one.

In other words, the FC-ECU 24 is configured to determine, when the shift lever 58 is operated, whether this operation is performed for the first time or later based on the count at the counting unit 82. Then, if the operation is performed for the first time, the FC-ECU 24 warns the user to close the lid 46 by displaying, for example, warning information similarly to that at step S18, and additionally outputting alert sound. If the operation is performed for the second time (the count N≠0), the FC-ECU 24 assumes that the user is under certain circumstances, and proceeds to step S35 to cancel the filling travel prohibition control. This configuration allows travel of the fuel cell vehicle 10 depending on the circumstances of the user.

The number of times that the shift lever 58 has been operated by the user when the filling travel prohibition control is canceled is not only set to the second time as described above but also may be freely designed.

Figure 6:
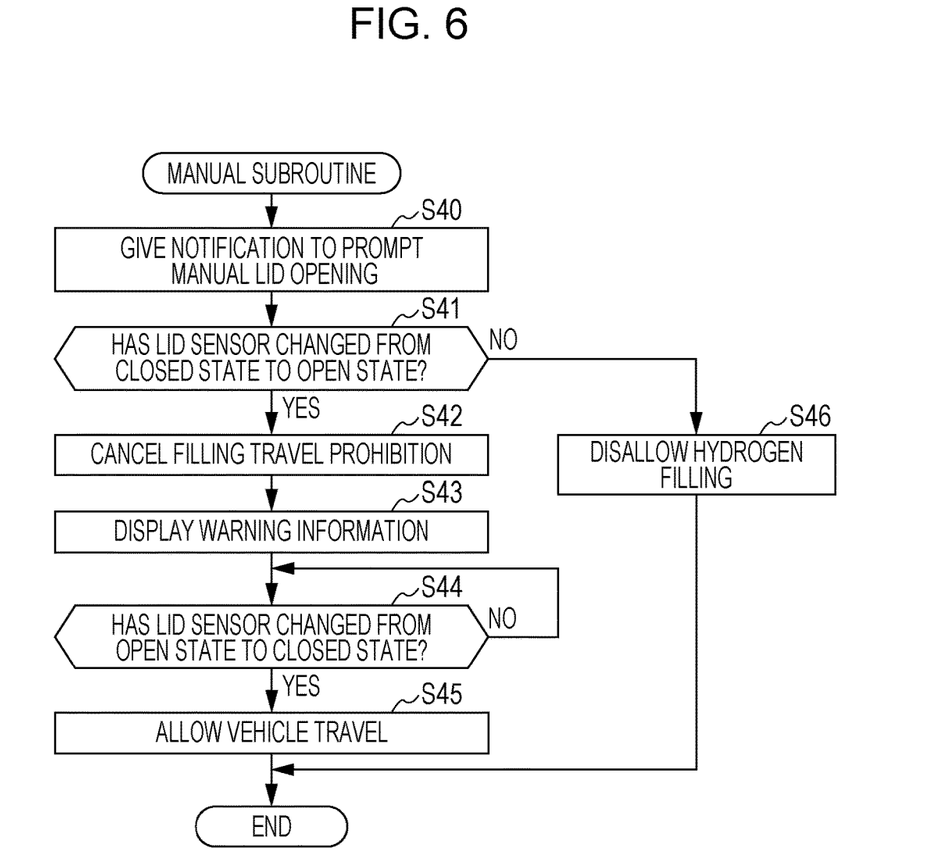
FIG. 6 is a third flowchart illustrating control of the fuel cell vehicle at filling.

The following describes the manual subroutine with reference to FIG. 6. As described above, the manual subroutine is performed when it is found that there is a trouble with the electric actuator 48 and the lid 46 cannot be normally opened. Thus, the FC-ECU 24 prompts the user to manually open the lid 46 (step S40). In this case, the notification unit 84 preferably performs display (notification) on the monitor 62 to open the lid 46, prompting an action by the user.

In the manual operation of the lid 46, the lid sensor determination unit 72 determines whether the lid sensor 68 is changed from the closed state to the open state (step S41).

If the lid 46 has transitioned to the open state (YES at step S41), the FC-ECU 24 recognizes that a condition to perform hydrogen gas filling is satisfied, and then does not perform the filling travel prohibition control (step S42). In other words, by not performing the filling travel prohibition control, the FC-ECU 24 can prevent the shift lever 58 from being locked while there is a trouble with the electric actuator 48. At the same time, the notification unit 84 gives notification of warning information through the monitor 62 or the speaker 64 (step S43), warning the user that the vehicle is in filling.

After hydrogen gas filling, the lid sensor determination unit 72 determines whether the lid 46 has transitioned from the open state to the closed state (step S44). Specifically, in the manual subroutine, since the electric actuator 48 is failed and thus the lid 46 cannot be electrically closed, the lid sensor 68 detects the closed state of the lid 46 to check whether the lid 46 is manually closed.

If the lid sensor 68 has transitioned from the open state to the closed state (YES at step S44), the FC-ECU 24 drives the fuel cell system 12 to allow travel of the fuel cell vehicle 10 based on an operation by the user (step S45).

At step S41, if the lid sensor 68 has not transitioned from the closed state to the open state (NO at step S41), the FC-ECU 24 disables hydrogen gas filling (step S46). In this case, in the filling drive device 50, the electric actuator 48 and the lid sensor 68 are failed, and it is expected that hydrogen gas filling would causes significant troubles. Thus, improved safety can be achieved by not performing hydrogen gas filling. At step S46, the notification unit 84 preferably gives warning that a fuel filling part of the fuel cell vehicle 10 has a defect, and prompts repair.

As described above, the fuel cell vehicle 10 according to the present embodiment can determine that no component of the lid 46 is failed when an opening operation on the lid switch 56 through the FC-ECU 24 coincides with detection of the open state of the lid 46 by the lid sensor 68. Thus, the fuel cell vehicle 10 can excellently restrict travel of the vehicle by performing the filling travel prohibition control, thereby preventing disadvantage of travel of the vehicle while the nozzle is connected with the receptacle 40, and reliably performing hydrogen gas filling. Accordingly, the fuel cell vehicle 10 can achieve further improved usability.

In this case, the FC-ECU 24 can remind the user that the user has forgotten to perform an operation to close the lid 46 through notification of warning information when the shift lever 58 is operated by the user during the filling travel prohibition control. In this manner, the fuel cell vehicle 10, can achieve further improved safety. In addition, the FC-ECU 24 cancels the filling travel prohibition control when the shift lever 58 is operated after the notification of warning information. In this manner, the lid 46 can prevent continuous prohibition of travel of the vehicle due to, for example, failure, thereby providing the user with further improved convenience.

It can be estimated that failure occurs to any component of the lid 46 when an opening operation or a closing operation on the lid switch 56 does not coincide with detection of the open state or the closed state by the lid sensor 68. Thus, the FC-ECU 24 can avoid incapability of the vehicle to travel by not performing the filling travel prohibition control. The FC-ECU 24 can warn the user not to perform travel of the vehicle during hydrogen gas filling through the notification of warning information when the filling travel prohibition control is not performed.

The present disclosure is not limited to the above-described embodiments, but various kinds of modifications may be achieved without departing from the scope of the present disclosure.

The present disclosure provides a fuel cell vehicle including a lid capable of opening and closing a feed unit for supplying fuel gas to a tank, a switch for performing an operation to switch opening and closing of the lid, a sensor configured to detect an open state and a closed state of the lid, and a control unit configured to perform travel restriction control to restrict travel of the fuel cell vehicle when an opening operation on the switch coincides with detection of the open state of the lid by the sensor.

As described above, the control unit of the fuel cell vehicle can determine that no component of the lid is failed when an opening operation on the switch coincides with detection of the open state of the lid by the sensor. With this configuration, the fuel cell vehicle can excellently restrict travel of the vehicle to prevent disadvantageous travel of the vehicle while the feed unit is connected with a nozzle, thereby achieving reliable fuel gas filling. Thus, the fuel cell vehicle can achieve further improved usability.

In this case, the control unit preferably includes a notification unit configured to give notification of warning information when a shift lever is operated by a user during the travel restriction control.

In this manner, the control unit can remind the user that the user has forgotten to perform an operation to close the lid through the notification of the warning information when the shift lever is operated by the user during the travel restriction control. Thus, the fuel cell vehicle can achieve further improved safety.

In addition to the above-described configuration, the control unit is preferably configured to cancel the travel restriction control when the shift lever is operated by the user during the travel restriction control after the notification of the warning information.

In this manner, the travel restriction control is canceled when the shift lever is operated after the notification of the warning information by the control unit, thereby preventing continuous prohibition of travel of the vehicle due to, for example, failure of the lid, and thus providing the user with further improved convenience.

In addition, the control unit preferably gives notification of warning information without performing the travel restriction control when an opening operation or a closing operation on the switch does not coincide with detection of the open state or the closed state of the lid by the sensor.

It can be estimated that failure occurs to any component of the lid when the opening/closing operation on the switch does not coincide with detection of the open/closed state by the sensor. Thus, the control unit avoids incapability of the vehicle to travel by not performing the travel restriction control. The control unit can warn the user not to perform travel of the vehicle during filling through the notification of the warning information when the travel restriction control is not performed.

According to the present disclosure, a fuel cell vehicle can achieve further improved usability by restricting operation at fuel filling based on an open state of a lid but allowing operation as appropriate depending on failure of any component of the lid.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle comprising:
    a lid capable of opening and closing a feed unit for supplying fuel gas to a tank;
    a switch for performing an operation to switch opening and closing of the lid;
    a sensor configured to detect an open state and a closed state of the lid; and
    a control unit configured to perform travel restriction control to restrict travel of the fuel cell vehicle when an opening operation on the switch coincides with detection of the open state of the lid by the sensor, the control unit being configured to cancel the travel restriction control in response to:
    an operation of a shift lever by a user during the travel restriction control and after the control unit outputs warning information, or a plurality of operations of the shift lever by the user during the travel restriction control.

2. The fuel cell vehicle according to claim 1, wherein the control unit includes a notification unit configured to output the warning information when the shift lever is operated by the user during the travel restriction control.

3. The fuel cell vehicle according to claim 2, wherein the control unit is configured to cancel the travel restriction control when the shift lever is operated by the user during the travel restriction control after the output of the warning information.

4. The fuel cell vehicle according to claim 1, wherein the control unit is configured to output the warning information without performing the travel restriction control when an opening operation or a closing operation on the switch does not coincide with detection of the open state or the closed state of the lid by the sensor.

5. The fuel cell vehicle according to claim 1, wherein the output of the warning information is in the form of a display on a monitor.

6. The fuel cell vehicle according to claim 1, wherein the control unit is configured to cancel the travel restriction control in response to a determination that the sensor has failed, and after the control unit outputs the warning information.

7. A fuel cell vehicle comprising:
a lid to open and close a fuel inlet through which fuel gas is to be supplied to a tank;
a switch to take an opening position to open the lid and a closing position to close the lid;
a sensor to detect whether the lid opens or closes the fuel inlet; and
circuitry configured to:
prohibit the fuel cell vehicle from travelling in a travel restriction control when the sensor detects that the lid opens the fuel inlet while the switch takes the opening position, and
cancel the travel restriction control in response to:
an operation of a shift lever by a user during the travel restriction control and after outputting warning information, or
a plurality of operations of the shift lever by the user during the travel restriction control.

8. The fuel cell vehicle according to claim 7, wherein the circuitry includes a notification unit configured to output the warning information when the shift lever is operated by a user during the travel restriction control where travel of the fuel cell vehicle is prohibited.

9. The fuel cell vehicle according to claim 8, wherein the circuitry is configured to cancel the travel restriction control when the shift lever is operated by the user during the travel restriction control after the output of the warning information.

10. The fuel cell vehicle according to claim 7, wherein the circuitry is configured to output the warning information without performing the travel restriction control where travel of the fuel cell vehicle is prohibited when an opening operation or a closing operation on the switch does not coincide with detection of the open state or the closed state of the lid from the sensor.

11. The fuel cell vehicle according to claim 7, wherein the output of the warning information is in the form of a display on a monitor.

12. The fuel cell vehicle according to claim 7, wherein the circuitry is configured to cancel the travel restriction control in response to a determination that the sensor has failed, and after the control unit outputs the warning information.

13. A control method for a fuel cell vehicle including a lid to open and close a fuel inlet through which fuel gas is to be supplied to a tank and a switch to take an opening position to open the lid and a closing position to close the lid, the control method comprising:
detecting whether the lid opens or closes the fuel inlet;
initiating a travel restriction control in which the fuel cell vehicle is prohibited from travelling when it is detected that the lid opens the fuel inlet while the switch takes the opening position; and
cancelling the travel restriction control in response to:
an operation of a shift lever by a user during the travel restriction control and after an output of warning information, or
a plurality of operations of the shift lever by the user during the travel restriction control.

14. The control method according to claim 13, further comprising:
outputting the warning information when the shift lever is operated by the user during the travel restriction control where travel of the fuel cell vehicle is prohibited.

15. The control method according to claim 14, further comprising:
cancelling the travel restriction control when the shift lever is operated by the user during the travel restriction control after the output of the warning information.

16. The fuel cell vehicle according to claim 13, further comprising:
outputting the warning information without performing the travel restriction control where travel of the fuel cell vehicle is prohibited when an opening operation or a closing operation on the switch does not coincide with detection of the open state or the closed state of the lid of the lid.

17. The control method according to claim 13, wherein the output of the warning information is in the form of a display on a monitor.

18. The control method according to claim 13, wherein the control unit is configured to cancel the travel restriction control in response to a determination that the sensor has failed, and after the control unit outputs the warning information.

* * * * *